United States Patent [19]
Rosenberg

[11] 3,904,525
[45] Sept. 9, 1975

[54] WASTE TREATMENT APPARATUS

[76] Inventor: Lawrence R. Rosenberg, 1 Chelsea Ridge Dr., Wappingers Falls, N.Y. 12590

[22] Filed: Aug. 23, 1973

[21] Appl. No.: 390,892

[52] U.S. Cl. ................................. 210/150; 261/92
[51] Int. Cl.² ......................................... B01D 33/28
[58] Field of Search ....... 210/15, 17, 150, 151, 170, 210/195, 218–221; 261/92, DIG. 75

[56] References Cited
UNITED STATES PATENTS

| | | | |
|---|---|---|---|
| 2,591,497 | 4/1952 | Berl | 210/150 X |
| 3,269,542 | 8/1966 | Renzi et al. | 210/17 X |
| 3,371,033 | 2/1968 | Simmons et al. | 210/17 X |
| 3,528,549 | 9/1970 | Ray | 210/151 |
| 3,618,778 | 11/1971 | Benton et al. | 210/150 |
| 3,660,277 | 5/1972 | McWhirter et al. | 210/15 X |
| 3,680,704 | 8/1972 | Schaefer | 210/170 X |
| 3,681,236 | 8/1972 | Bergles et al. | 210/195 X |
| 3,777,891 | 12/1973 | Stengelin | 210/150 |
| 3,788,478 | 1/1974 | Savage | 210/221 X |
| 3,789,986 | 2/1974 | Oldham et al. | 210/151 X |
| 3,827,559 | 8/1974 | Gass et al. | 210/150 |

Primary Examiner—Samih N. Zaharna
Assistant Examiner—Robert H. Spitzer
Attorney, Agent, or Firm—William J. Dick

[57] ABSTRACT

This patent discloses waste treatment apparatus in which after primary treatment of waste (liquid waste) aeration of the waste occurs in the equalization tank to start the process to change the normally anerobic waste material to at least a partially aerobic state. Thereafter the waste material is applied by a spray to at least the first stages of a rotating disk biological reactor where biological slimes are grown on the rotating disks, which slimes serve to further the process of removing pollutants from the waste being supplied thereto. The reactor section is comprised of a plurality of disks each made up of groups of thin wedge shaped elements of at least a pair of sets, each element of a set cooperating with each other element in tightly packed relation for ease of shipping while when mated with the elements of the other set are spaced apart, and when connected together about the rotating shaft of the reactor form spaced apart disks upon which the biological slime may form.

The purpose of this abstract is to enable the public and the Patent Office to determine rapidly the subject matter of the technical disclosure of the application. This abstract is neither intended to define the invention of the application nor is it intended to be limiting as to the scope thereof.

Claims, 16 Drawing Figures

WASTE TREATMENT APPARATUS

SUMMARY OF THE INVENTION AND STATE OF THE PRIOR ART

The present invention relates to apparatus for waste treatment, and more particularly relates to improvements in biological reactors, pre-effluent aeration and supply of effluent to the reactor.

Because of the increased concern by the general population and thus of Government regulatory agencies, water purification has become one of the primary concerns of the ecologists. Obviously population shifts as well as industrial expansion has created a problem by a constant increase in the level of pollution of lakes, rivers and streams. To reverse the trend of increased pollution of such bodies of water it has become necessary to increase the size and efficiency of existing waste treatment facilities while improving on new plants without an overt increase in the cost of construction of new plants.

By way of background there are three basic processes presently in use for waste treatment. The most widely recognized of the three processes is that of primary waste treatment in which sedimentation occurs to effect the removal of the solids which may settle from the waste water. Of course, chemical coagulants are sometimes used to increase the efficiency of the process in which case the primary treatment may remove up to 50% of the carbonaceous pollutants when such pollutants may be expressed by bio-chemical oxygen demand (hereinafter referred to as B.O.D.)

The second process utilized for the treatment of waste water in normally termed a secondary treatment process which is accomplished conventionally by providing apparatus which permits the growth of biological slimes (sometimes called biomasses) or flocs which utilize the pollutants in the waste media to enhance their natural growth processes. In the secondary treatment process, the waste water is brought into contact with the biological slimes to supply nutrients and oxygen to the micro organisms, the slimes then being separated from the waste water to effect the necessary purification or clarification of the waste media. Thus in this type of secondary treatment process, it is necessary that the biological slime be provided with a continuous supply of nutrients so as to maintain the growth of the micro organisms as well as requiring a continued oxygen supply to effect the nutrition process.

The second process of secondary treatment of waste water which has gained wide acceptance is known as the activated sludge process which provides for the aeration of the waste water in the presence of a controlled amount of free floating biological flocs. The micro organisms in the biological flocs extract the pollutants from the waste water, thereby deriving their nutrition, and are supplied with oxygen by diffused air which is injected below the surface of the aeration tank. Thus pollutants may be removed from the waste material by conversion into biological slimes which feed, in a continuous cycle, upon the nutrients of the waste along with appropriate oxygenation. While this process can remove approximately 60% of the carbonaceous B.O.D., employing certain variations in aeration, such as modified aeration and step aeration, up to 90% of the carbonaceous B.O.D. as well as oxidation of ammonia nitrogen may occur.

The third basic process for treating waste water is commonly referred to as the standard rate or high rate trickling filtration process. In this type of process, settled waste media is passed over biological slimes grown on and attached to stationary surfaces. Purification or clarification of the waste media occurs in a manner similar to the activated sludge process in that organic pollutants in the waste water are converted into biological slimes that are subsequently separated from the clarified media. Plants employing such a process normally effect a removal of between 60 and 90% of the carbonaceous B.O.D. depending upon the flow rate and the load presented to the filtration media.

In recent years a fourth process has come into vogue, this process being generally referred to as a rotating disk process for secondary biological waste media treatment. The process evolved from basic work and research that was conducted in Germany in the mid 50's. Due to its inherent advantages, which will be discussed more fully hereinafter, there are numerous such installations existing today in western Europe. In the mid 60's the process was introduced into the United States. In this secondary biological waste water treatment process, large diameter plastic media or disks are mounted on a horizontally disposed shaft and rotated slowly in a tank with 40 to 50% of the surface area of the disks being submerged in the waste media at any one time. Organisms which are present in the waste water adhere to the rotating disks and multiply, forming a biological mass on the surface of the rotating disks. As the disks rotate, the water in the tank moves down the disk, absorbing oxygen from the surrounding air. The organisms not only remove oxygen from the air but also remove both dissolved oxygen and organic materials from the film of water as it moves down the rotating disk. The normal stress of the biological mass and the shearing forces due to the weight of the mass as it passes through the waste media causes any excess biological mass to drop from the disk into the waste media. In this manner clogging of the disks is prevented, while a constant biological mass of micro organisms is kept in the media. Additionally, the rotating disks create a mixing action which maintains the solids in suspension until the treated waste water carries the waste, including the solids, out of the tank for separation and disposal. The advantages of the rotating biological disks are many: (1) the surface area of the disks is far greater than the surface area of the waste media in the tank, permitting the development of a large area of fixed biological culture; (2) the movement of the disks through the media provides vigorous contact of the biological mass with the waste media providing efficient aeration of the waste media; (3) the rotation of the reactor provides for agitation of the media.

However, there are some disadvantages to the existing apparatus utilized for rotating biological reactors. For example, in large plants where the disks are of great diameter there is difficulty in shipping the disks from their point of manufacture to the point of assembly, requiring special packing, special carriers resulting in increased costs of plant construction. Additionally, due to the very large diameter of the disks anywhere from 12 to 24 feet in diameter and even more, molds for formation of the disks are extremely expensive raising the cost of manufacture. Also, because of the way some systems are presently employed, the waste water is composed almost entirely of an anaerobic population which requires excessively large biological reactors to effectively provide secondary treatment to the waste media.

In view of the above, it is a principal object of the present invention to provide an improved rotating biological reactor which is easier to assemble in the field.

Another object of the present invention is to provide an improved biological reactor disk in which the disk is composed of a plurality of individual elements to facilitate construction in the field as well as ease of shipping.

Yet another object of the present invention is to provide an improved disk for a biological reactor in which the individual disks are formed of a plurality of elements, each element of adjacent disks being adapted for cooperation with the elements of disks on opposite sides thereof so as to permit ease of alignment of the disks and proper spacing thereof from disk to disk.

Yet another object of the present invention is to provide elements of a disk of a rotating biological reactor in which the elements of some of the disks may be packed in nested relation one with regard to the other for ease of shipment, and which may be more easily handled in the field when mating with elements of another set.

Still another object of the present invention is to provide means for at least starting the aerobic process by supplying oxygen to the media in the equalization tank so as to reduce the loading effect on the first stages of the biological reactor.

Yet another object of the present invention is to provide the novel manner of moving the media onto the initial stages of the biological reactor so as to increase the effective area of the initial stages of the reactor, and to prevent inadvertent biomass removal from the initial stages during periods of high media throughput.

Other objects and a more complete understanding of the invention may be had by referring to the following specification and claims taken in conjunction with the accompanying drawings in which:

Figure 1:
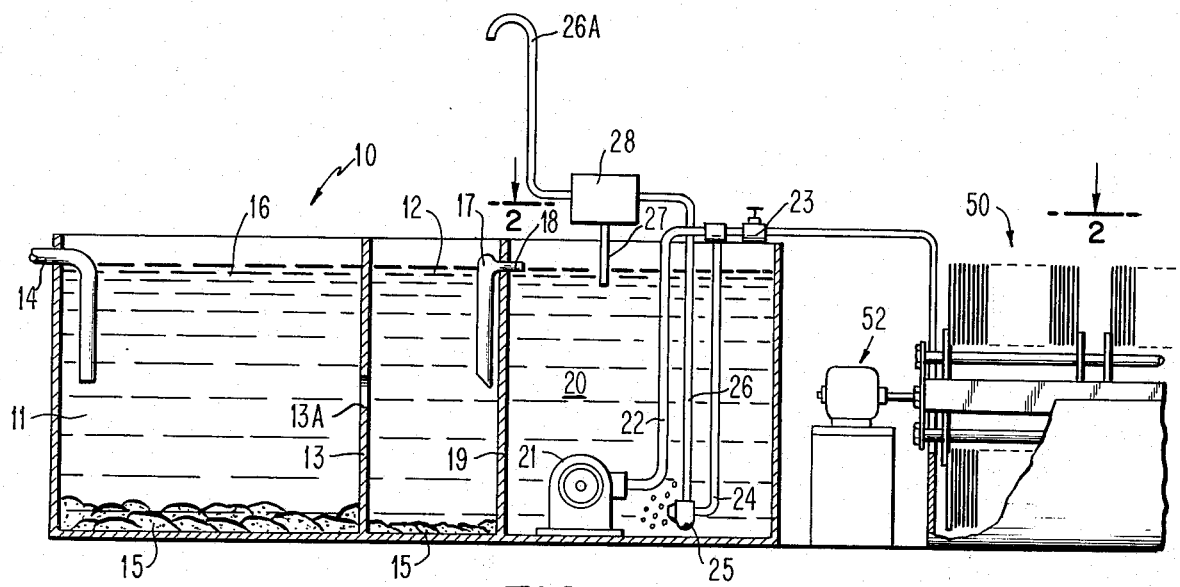
FIG. 1 is a fragmentary sectional view of primary and secondary treatment apparatus constructed in accordance with the present invention.

Referring now to the drawing, and especially FIG. 1 thereof, a primary and partial view of a secondary treatment apparatus 10 and 50 respectively is illustrated therein. In the illustrated instance the primary treatment apparatus comprises the well known septic tank, which includes a first compartment 11 which is joined to a second compartment 12, the compartments being divided by an upstanding wall 13 having a port 13A therein at the approximate midpoint of the wall. The first compartment 11 includes a waste or raw sewage inlet pipe 14 which supplies raw sewage to the first compartment 11 of the septic tank. As is conventional, the septic tank acts as a settling tank, the sludge or heavier material 15 falling to the bottom of the tank or first compartment 11, while the lighter grease or scum moves up the liquid waste and floats along the upper surface thereof as at 16. At the central portion of the first compartment the waste water is clearer than either the upper or lower portion, and thus the clarified waste water moves through port 13A into the second compartment 12 wherein additional clarification occurs, sludge 15 also settling into the bottom in compartment 12 while scum and grease float on the surface of the upper portion. In the second compartment, once again therefore, the central portion of the waste media forms a clarified zone. Accordingly, the flow of waste media is normally taken from this clarified zone and moved therefrom into further processing apparatus.

As shown in FIG. 1, an outlet pipe 17 extends into the clarified zone and has an outlet port 18 which projects through an upstanding wall 19 separating the second compartment from an equalization, sometimes called an antisurge tank 20. The equalization or antisurge tank 20 functions to equalize the daily flow and thereby even out the flow to the secondary treatment apparatus 50.

Conventionally the waste material entering from the septic tank or primary treatment apparatus into the equalization tank 20 is anaerobic with regard to its content of oxygen. (Anaerobic means "devoid of oxygen".) Thus the waste matter that is in the equalization tank is anaerobic and at the same time full of organic matter because the bacteria has consumed all of the available oxygen. Conventionally, the anaerobic waste material is then applied to a secondary treatment apparatus wherein oxygen is supplied to allow bacteria growth to consume the organic matter in the waste media, thereby removing the waste material.

Figure 2:
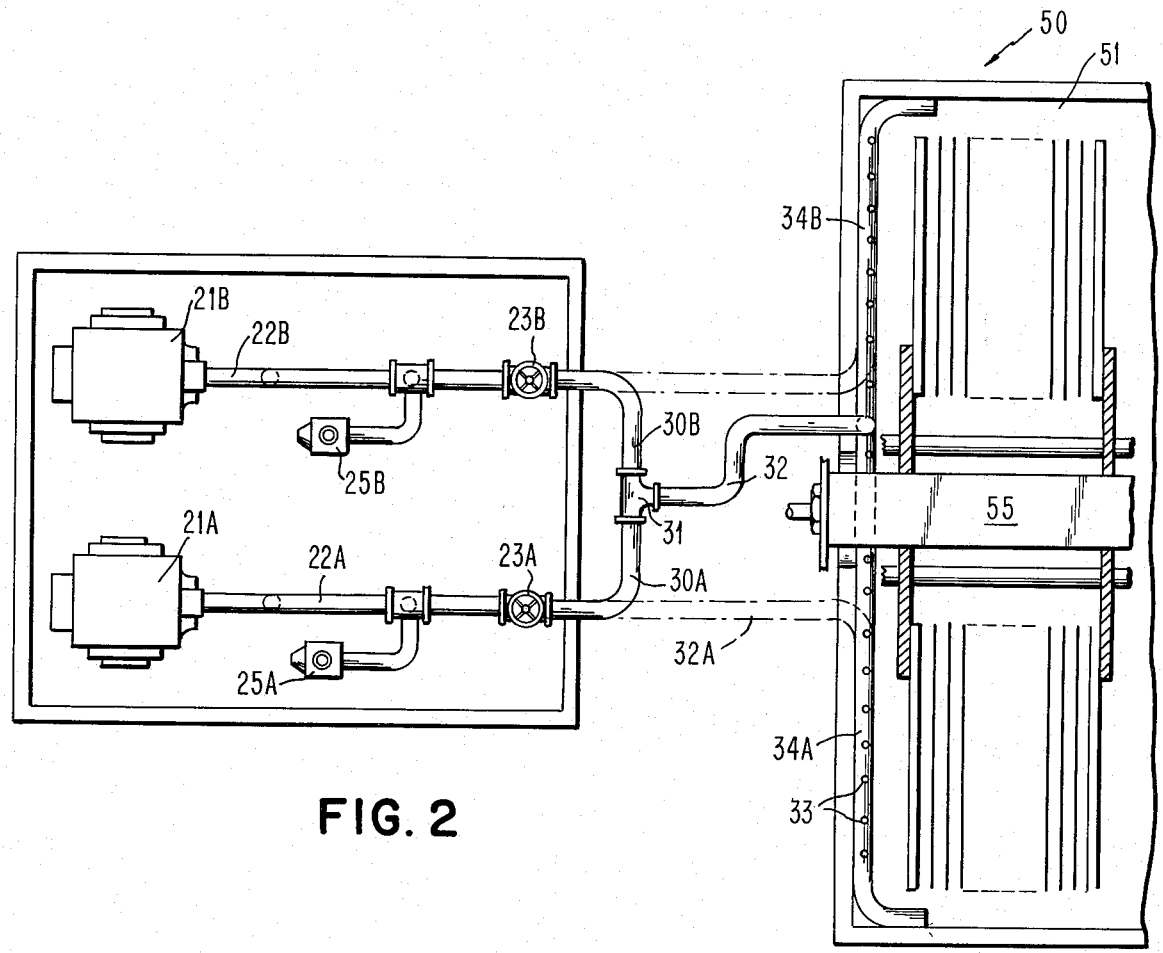
FIG. 2 is an enlarged fragmentary sectional view taken along line 2—2 of FIG. 1.

In accordance with a feature of the invention, means are provided in the equalization tank to start the process of changing the normally anaerobic waste material to at least make the waste media partially aerobic. To this end, and as best illustrated in FIGS. 1 and 2, the equalization tank 20 is provided with at least one, in the illustrated instance a pair of dosing pumps 21, the pumps being designated 21A and 21B (FIG. 2) for purposes of identification, which feed the waste media in the equalization tank through discharge piping 22, (22A and 22B) to the secondary treatment apparatus 50. Each of the discharge piping includes a metering valve 23, (23A and 23B) to meter the flow from the equalization tank to the secondary treatment apparatus.

In accordance with this feature of the invention, means are provided to supply oxygen to the waste media in the equalization tank. To this end, on the inlet side of the metering valves 23A, 23B is a recirculating or feedback line or pipe 24 which supplies a recirculating stream of waste media to an aerator, in the illustrated instance a venturi type nozzle discharge pump 25, and designated 25A and 25B in FIG. 2. The aerator or venturi pump 25 has an air inlet pipe 26 which extends vertically in the equalization tank and is connected to the atmosphere or a source of air so as to permit, as the pump 25 operates, the drawing into and discharge from the pump of oxygen containing air. Although not shown, the air inlet piping of each venturi pump (25A, 25B) may be joined to the air inlet piping of the other to form a common air intake or the intakes may be separate.

Inasmuch as the oxygen supplied by the aerating or venturi pump 25 to the waste media in the equalization tank tends to move upwardly through the waste, the discharge being preferably near or adjacent the bottom of the equalization tank, an air space or pocket will form at the upper portion of the tank which may, if desired, by recycled through the aerator and the tank by providing a vent 27 at the top of the tank, which vent is connected to an ozone generator 28, such as the ozone generator sold by C. E. Bauer Company of Springfield, Ohio. In this embodiment, the apparatus 28 may also have an intake 26A from the atmosphere through it so that a constant charge of fresh air is supplied to the aerating or venturi pump 25.

Thus even with the metering valves 23 closed down, a constant discharge of waste media through the piping or recirculating line 24 occurs and thus the pump 25 effects preliminary aeration of the waste media in the equalization tank starting the process of injecting dissolved oxygen into the waste media and permitting the initial formation of some oxygen requiring bacteria to commence the process of removing nutrients (organic material) from the waste media. Additionally, even this preliminary head start on formation of or changing of the waste media in the equalization tank to at least a partially aerobic nature will give a head start to the secondary treatment apparatus permitting an overall reduction in the size of the secondary treatment apparatus for given flow conditions.

Under normal operating conditions only one of the dosing pumps 21 is conventionally used to discharge waste media from the equalization tank 20 into the secondary treatment apparatus 50. However, it is normally required that there be a standby dosing pump so that in the event of breakdown of one of the pumps, the system will not have to be shut down when one pump is out of operation and being repaired. Accordingly, and as best shown in FIG. 2, the metering valves 23 are conventionally connected through piping 30A and 30B to a tee 31 which discharges the waste media through line 32 to the inlet of the secondary treatment apparatus 50.

In conventional plants the piping 32 discharges directly into the first compartment of the secondary treatment apparatus 50 which under normal loading conditions is satisfactory. However, and as will be more fully explained hereinafter, under conditions of severe loading, that is when waste media flow is at a very high rate, that is the metering valves 23 are wide open, many times the hydraulic agitation effects a removal of the biological slime (biomass) from the initial stages of the rotating biological reactor. This cuts down the efficiency of the secondary treatment apparatus and can result in degradation of the entire system because of the removal of the nutrient consuming bacteria from the initial stages of the reactor. Accordingly, and in accordance with one feature of the invention, extending the inlet piping 32 in opposite directions along the inlet of the tank 51 of the biological reactor and by providing a plurality of apertures 33 in the piping 34A and 34B thus extended the media may be sprayed out of the piping along the entire width of the tank 51 inhibiting severe hydraulic agitation, even under high flow conditions. Preferably the apertures 33A are directed downwardly so that the media entry is into the tank as opposed to being against the first stages of the reactor. In this connection the apertured single pipe could be a plurality of inlet pipes.

Because of the increased flow which is possible due to pre-aeration, and in the event that it is desirable to operate both dosing pumps 21A and 21B, the systems may be split such as shown in dotted lines in FIG. 2 so that the inlet piping from pump 21A may extend directly as through piping or inlet line 32A into a separate entry pipe 34A, while the inlet to the tank 51 from dosing pump 21B may be in a like manner split as at 32B and enter into a separate inlet line as at 34B. If desired, the pipes 34A and 34B may be joined at the central portion of the tank as by a valve (not shown) so that the systems may be segregated or joined together. The placement of a valve intermediate the two lines will permit the use of just one pump as desired and will permit segregation of the systems in the event that repair or cleaning is necessary in either of the systems.

The secondary treatment apparatus of the illustrated system comprises a biological reactor (as it has come to be known in the trade) which includes a compartmented tank 51 having a contoured bottom with longitudinally spaced apart baffles or weirs (not shown) to separate the tank into longitudinally extending compartments. As shown in FIGS. 1–4, the reactor comprises a rotor 55 mounted for rotation in the tank 51, and includes at least first and second sets 60A and 60B of radially projecting arms 61 which are spaced about the rotor 55 and coupled thereto, the first set of arms 60A being axially spaced (see FIG. 4) from the second set of arms 60B. In accordance with the invention, a plurality of groups 70 of spaced apart pie or wedge shaped elements are arranged in superimposed, juxtaposition relation. Each group 70 elements is positioned intermediate adjacent radially projecting arms 61 of each of the first and second sets 60A and 60B, the groups forming thereby a plurality of disks 71 extending along the rotor 55. Coupling means 72 releasably couple each group of elements 70 to the arms 61. Drive means 52, in the illustrated instance an electric motor (see FIG. 1), effect a slow rotation of the rotor so as to cause at least a partial sumbersion of the groups of elements into the waste media in the tank during each rotation of the rotor.

In accordance with the invention the groups intermediate the longitudinally separated radially extending arms 61 of the set of arms 60A and 60B comprise sets of thin, wedge or pie shaped elements 73 and 74, the elements 73 forming a first set, and the elements 74 forming a second set. Each of the elements of a set has opposite major surfaces 73A, 73B, 74A, 74B and arranged so that elements of the first set are interdigitated with respect to the elements of the second set to thus form a group 70. As will be more fully explained hereinafter, the elements of each set are designed for mating in nested relationship with other elements of its own set, and adapted for a coacting spaced apart relationship and alignment with elements of the second set.

Figure 6B:
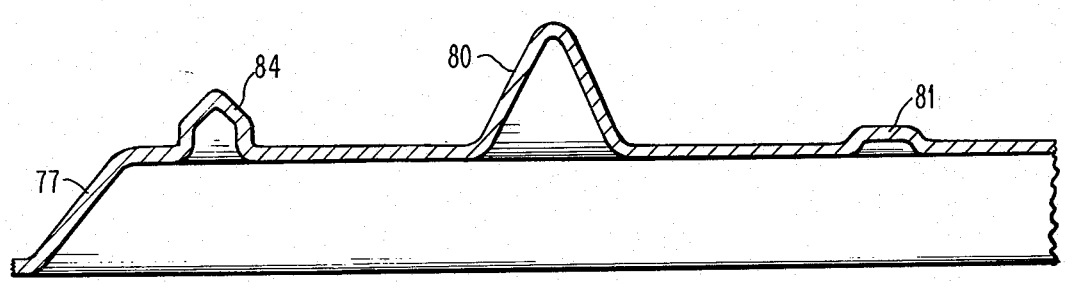
FIG. 6B is an enlarged fragmentary sectional view taken along line 6B—6B of FIG. 6.
Figure 6:
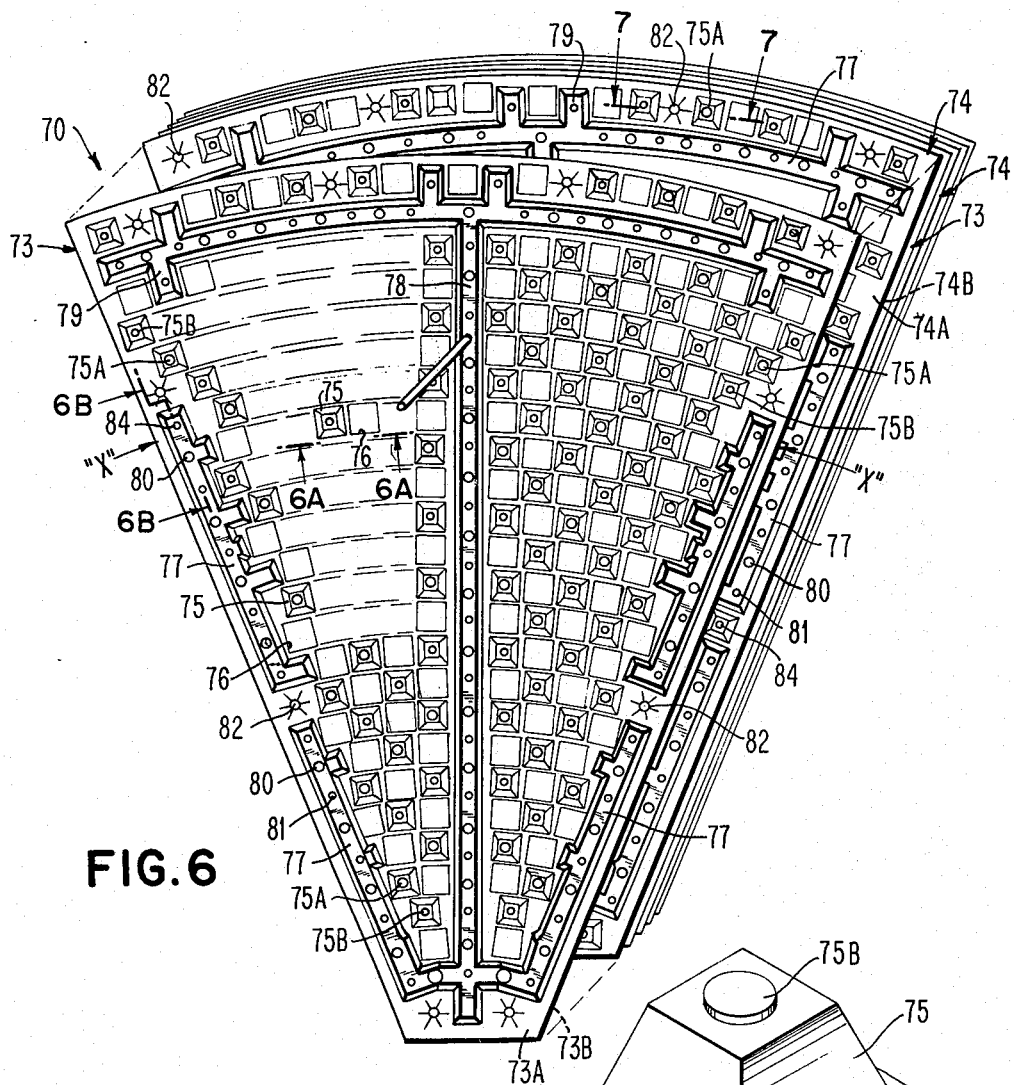
FIG. 6 is a perspective view of a plurality of elements comprising a group adapted for coupling to the apparatus best illustrated in FIGS. 3 and 4.
Figure 6A:
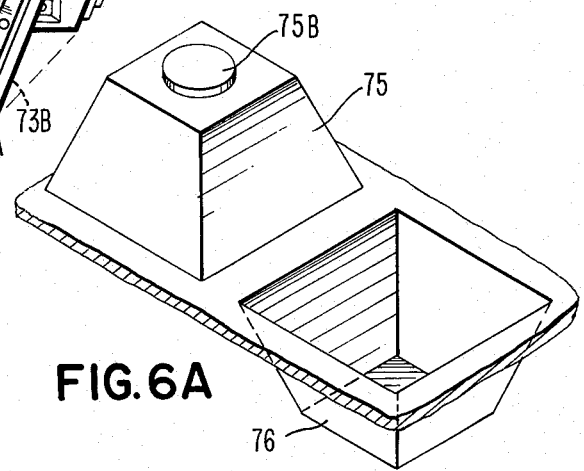
FIG. 6A is an enlarged fragmentary perspective view taken along line 6A—6A of FIG. 6.

Each of the elements of each of the sets of elements includes a plurality of protrusions 75 and depressions 76 therein, the protrusions and recessions, in the illustrated instance, being substantially identical in the plane of the major surfaces, although in FIG. 6 to avoid an optical illusion, the depressions 76 are shown merely as rectangles while the protrusions 75 are shown in detail. As shown in FIG. 6A, each of the protrusions and depressions is preferably in the form of truncated pyramids which, due to the thinness of the material used (such as polypropalene, polyethelene, etc.) serves to stiffen the wedge shaped element. As illustrated best in FIG. 6, each of the protrusions and depressions is adjacent one another in a preset predetermined pattern, which aids in the stability of the segment or element and adds to increase the effective surface area thereof. Circumscribing each of the elements in a broken array is an upstanding rib 77 which projects from one major surface of the elements, the rib serving, in a like manner, to stiffen the element in conjunction with a central rib or the like 78. Further stiffening action is obtained by the short ribs 79 which project from the rib 77, at various portions therealong. For purposes which will become more clear hereinafter, the protrusions 75 of the elements 73 of the first set are arranged to mate with like protrusions in the elements 74 of the second set.

In order to maintain the elements of one set in interdigitated spaced apart relation with respect to the elements of the other set, integral spacer and alignment means are preferably formed in the elements 73 and 74. To this end, and referring now to FIGS. 6, 6A, 6B and 7, each of the elements 73 and 74 includes integral spacers which cooperate with receptacles in the adjacent elements. In the illustrated instance, alternate ones of the protrusions 75 have a cone shaped projection 75A, while intermediate protrusions have a receptacle or dimple 75B. The projections 75A and receptacles 75B of the elements 73 being offset from the projections and receptacles of the elements 74. Additionally the ribs 77 and central rib 78 include spacers or projections 80 which alternate with receptacles or dimples 81, the spacers and receptacles of one set of elements 73 being offset with respect to like parts on the elements 74. The projections or spacers 75A and 80 may take any suitable form, in the present instance substantially conical, the tip abutting in the flat bottom of the receptacle in the adjacent element. The spacers serve to position the adjacent elements of the opposite set a predetermined distance apart to permit the growth of biological mass therebetween while effecting maximum surface contact of each of the elements with the waste media, permitting the waste water or media to drain from the elements as they are raised out of the tank by rotation and effecting maximum exposure of the biological slime to air.

Figure 7:
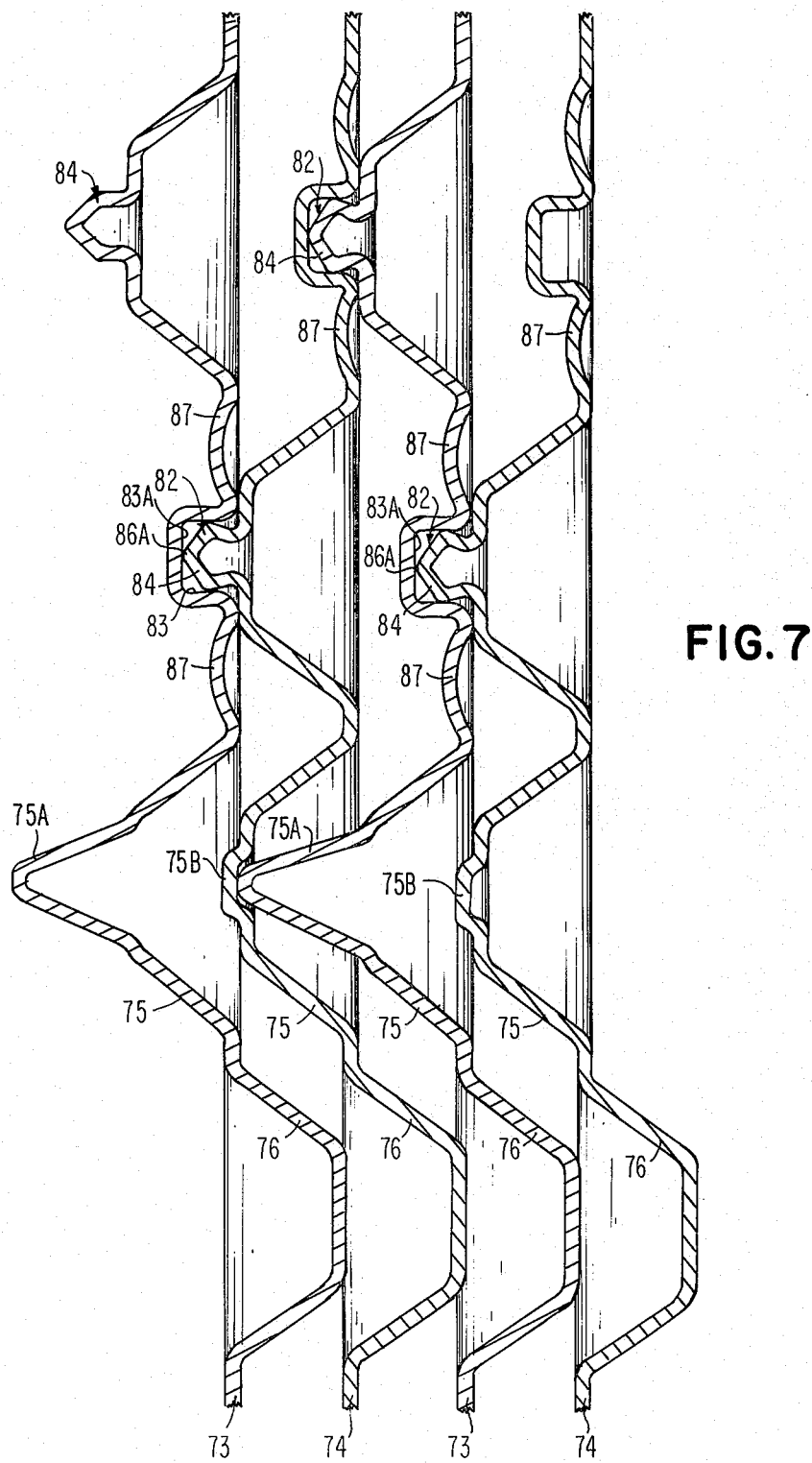
FIG. 7 is an enlarged fragmentary sectional view through a plurality of the elements illustrated in FIG. 6 to show their relationship one to the other.

Additionally, and as illustrated in FIG. 7, it may be desirable to provide integral alignment means so that the elements which are interdigitated may lock one to the other to effect not only rigidity of the group, but to prevent inadvertent displacement of one element with respect to the other. To this end, the alignment means 82 comprises a pocket 83 which frictionally engages a latch 84 in the adjacent element. Each of the elements includes both pockets and latches, the pockets in one element of a set adapted for coacting frictional engagement with latches of the adjacent element, when one element of a set is mated with an element of another set. As best illustrated in FIG. 6, the pockets 83 are reinforced by radially extending ribs 87 which aid in giving to the pockets a spring like action when the latch 84 enters into the pocket.

Figure 9:
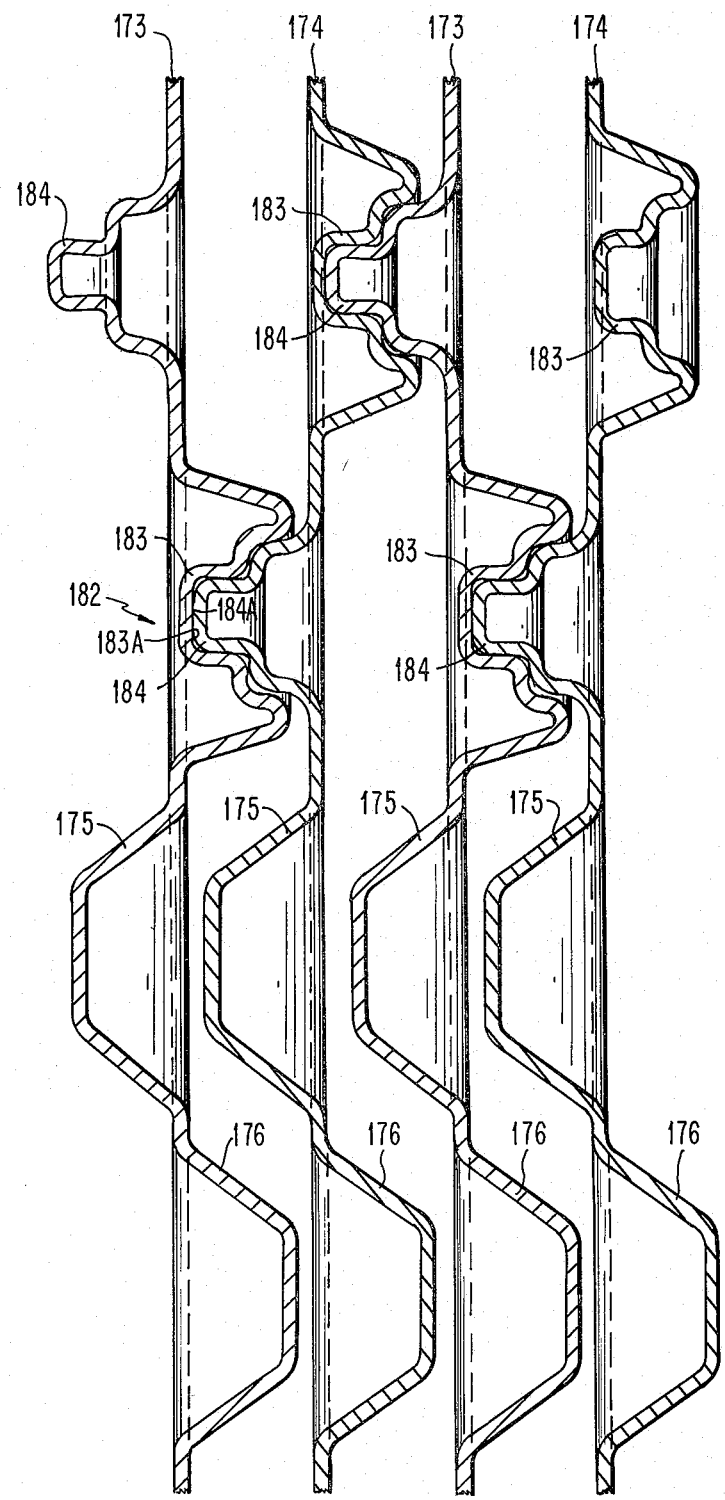
FIG. 9 is a fragmentary sectional view, similar to FIG. 7 but showing another embodiment of elements constructed in accordance with the present invention.

It should be recognized that in certain constructions, it may be desirable to make a unitized construction of the elements forming a group. To fabricate such a construction it is a simple matter to effect a preselected points localized heating of adjacent elements. For example, the latches 84 may be spot welded, the bottom 83A of the pocket, the weld being easily affected in assembling the elements by an application of heat to the pocket and tip of the latch 84 as the elements are assembled forming thereby an intergral structure of the group. Of course the elements may take many forms, which lend themselves to localized spot welding of one element to the other by spot heating. For example, and as shown in FIG. 9, elements 173 and 174 having protrusions 175 and depressions 176 may include integral alignment means 182 which comprise stepped pockets 183 which cooperate in frictional engagement with like formed latches 184. In the illustrated instance, to facilitate such welding process, the latch 184 includes a flat 184A at the upper portion thereof for intimate contact with the interior surface 183A of the pocket. The flat surface to flat surface contact facilitates the welding of the two surfaces one to the other merely by heating, for example with a hot iron, the outside of the pocket.

Figure 8:
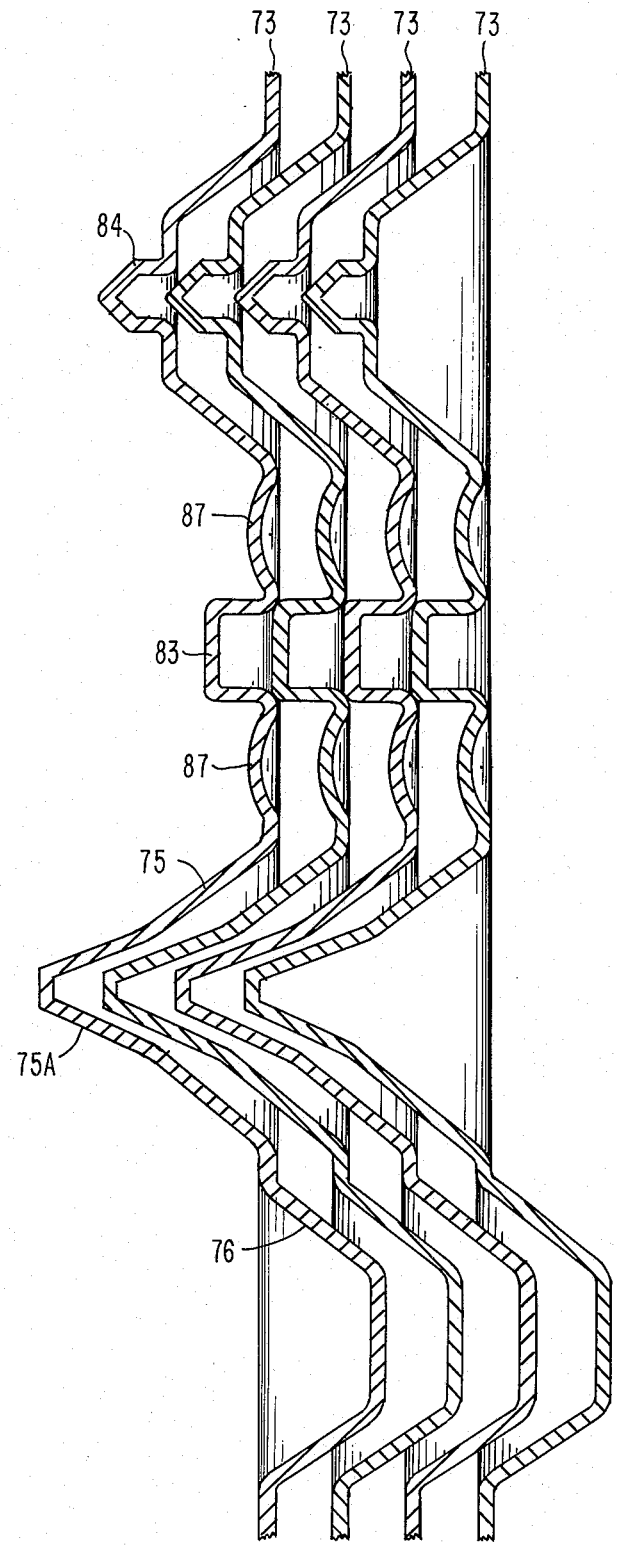
FIG. 8 is a fragmentary sectional view illustrating some of the elements illustrated in FIG. 6 positioned for shipment from a manufacturing source to a job site.
Figure 10:
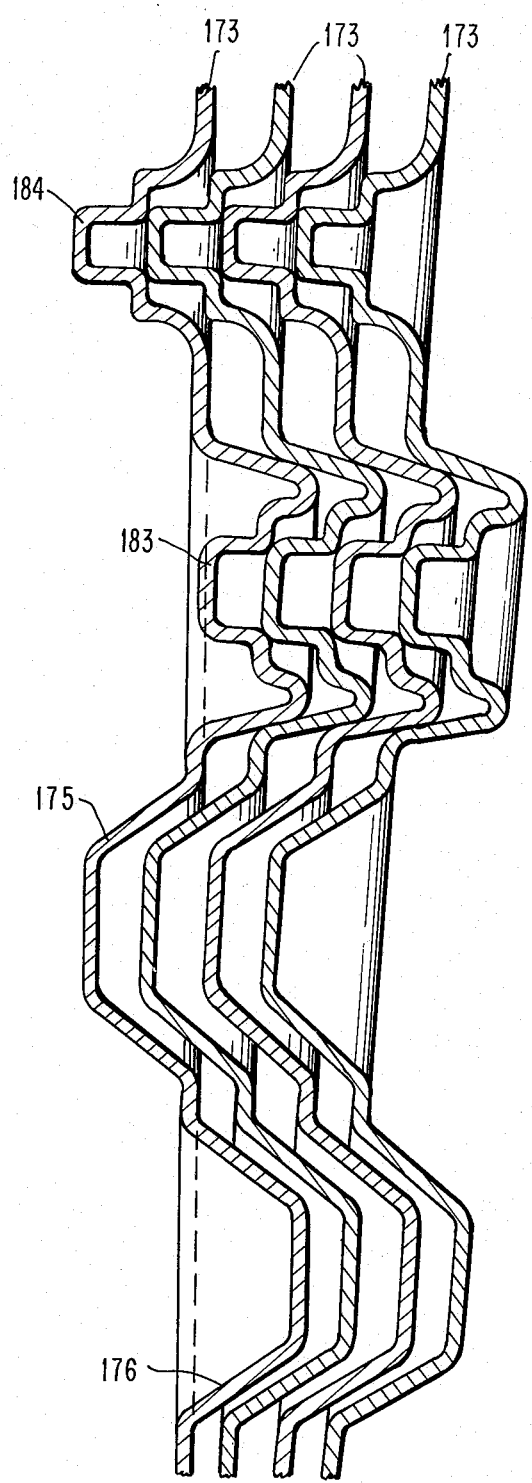
FIG. 10 is a fragmentary sectional view, similar to FIG. 8 but showing some of the elements illustrated in FIG. 9 in nested relation for shipment from a manufacturing source.

Each of the elements of a set is adapted for nesting with elements of its own set to make a compact package for shipment purposes from, for example, a manufacturing source. Such a stack of elements is illustrated in FIGS. 8 and 10 wherein the elements may be either of the sets 73, 74 or as shown in FIG. 10, the elements 173 or 174. In either case, these drawings illustrate the compact and nested arrangement of the elements one with respect to the other which facilitates their packaging for shipment.

Figure 3:
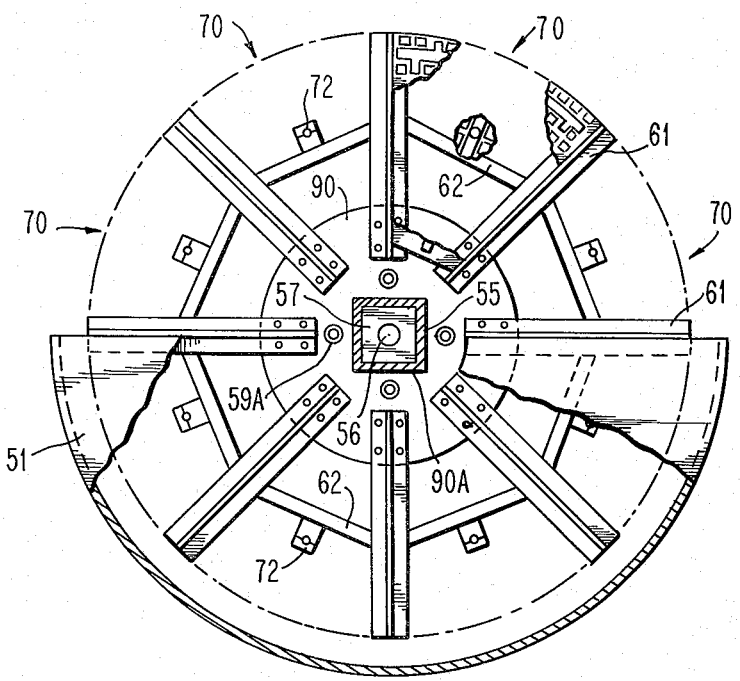
FIG. 3 is an enlarged fragmentary sectional view taken along line 3—3 of FIG. 1.
Figure 4:
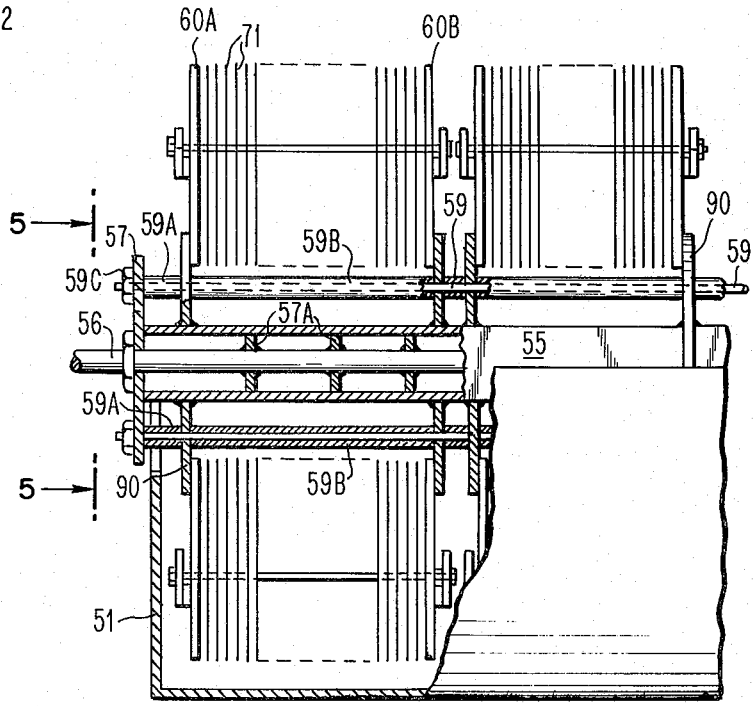
FIG. 4 is a fragmentary sectional side elevational view of a portion of the apparatus illustrated in FIGS. 1–3.

After the elements have been shipped to some location, either the job site or the fabrication place, they are assembled into the form best illustrated in FIGS. 6 and 7. After assembly the elements 73 being interdigitated with the elements 74, to form a group 70, a rod 88 is placed through the group 70, and more specifically through an aperture or the like 89 which extends through each of the elements of each set, the aperture in the illustrated instance (see FIG. 6) being formed through the central rib 78. As shown, the rod 88 extends beyond the group 70. The assembled group is then coupled between adjacent arms 61 of the first and second sets of arms 60A and 60B. To this end, the arms 61 comprise T shaped members which are coupled at their base to a plate 90 which is keyed on the rotor 55. As best illustrated in FIGS. 3 and 4, the arms 61 include cross brace members 62 which extend intermediate the arms circumscribing the plate 90 and thus the rotor 55. The rotor 55, as shown, is rectangular in cross section and houses a cylindrical shaft 56 which is anchored in the rotor as by gusset plates or the like 57A. The plate 90 includes a rectangular aperture 90A which mates with the rectangular rotor 55, whereby when the rotor rotates the arms are carried therewith.

In order to properly position the plates 90 on the rotor 55, the shaft 56 is bolted to a capture plate 57, in the present instance generally cross shaped, having apertures or holes 58 at the extended ends of the cross. Rods 59 which extend through the apertures 58 are suitably sleeved as at 59A, 59B and extend the entire length of the rotor, the rods 59 in conjunction with the sleeves serving to set the proper spacing between the plates 90 and functioning to hold the plates axially of the rotor so as to prevent inadvertent axial movement thereof, while permitting the placement of groups 70 of the elements as hereinafter described. As shown, the rods may be suitably threaded and held in place to the capture plate 57 as by nuts 59C.

Figure 3A:
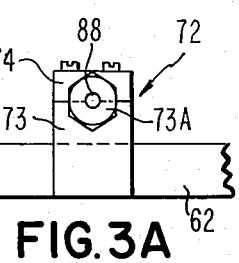
FIG. 3A is an enlarged fragmentary view of a portion of the apparatus illustrated in FIG. 3.
Figure 5:
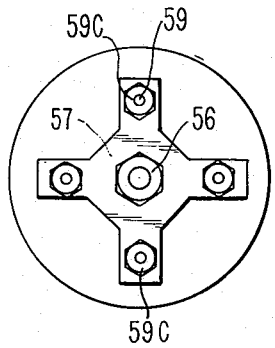
FIG. 5 is a fragmentary sectional view taken along line 5—5 of FIG. 4.

In order to secure the groups 70 to form the disks 71, coupling means 72 are provided to couple the groups intermediate the adjacent arms of a set 60A and axially intermediate the first and second set of arms 60A and 60B. In the present instance the coupling means are connected to the cross braces 62 and comprise a U shaped receiver 73 having an aperture 73A therein to receive the extended ends of rod 88. To hold the rods in the aperture 73A a cap 74 is provided which may be screwed to the U shaped member in a conventional manner as shown in FIG. 3A. Thus the rods 88 are lowered into the aperture 73A and then held in place by the cap 74 to prevent the groups 70 from dropping from the sets of arms when the rotor rotates the arms 61 into the tank 51. Once the group of elements have been coupled in the manner described to the braces 62 intermediate the arm 61, a plurality of disks is formed nad thereafter the apparatus may be utilized in the conventional manner.

It should be recognized that any number of means may be employed to connect the groups of elements 70 together and to the rotor to form the disks 71. For example, the elements, once formed in a group, may be wrapped with a band to hold the elements in mating relation. In this connection the elements may be notched or slotted along their periphery, as at "X" so that the band may fit in the notch and wrap the group. The group 70 may then be secured, as before, by the rod 88 to the sets of arms.

Figure 11:
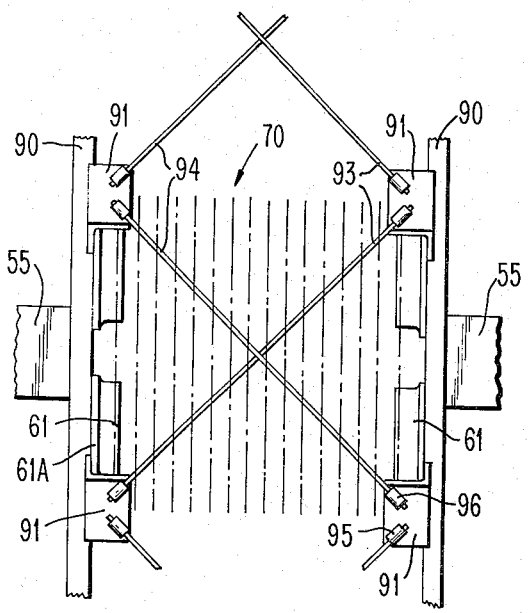
FIG. 11 is a fragmentary plan view of another embodiment showing alternate means to hold groups of elements in the apparatus illustrated in FIGS. 1–4.
Figure 12:
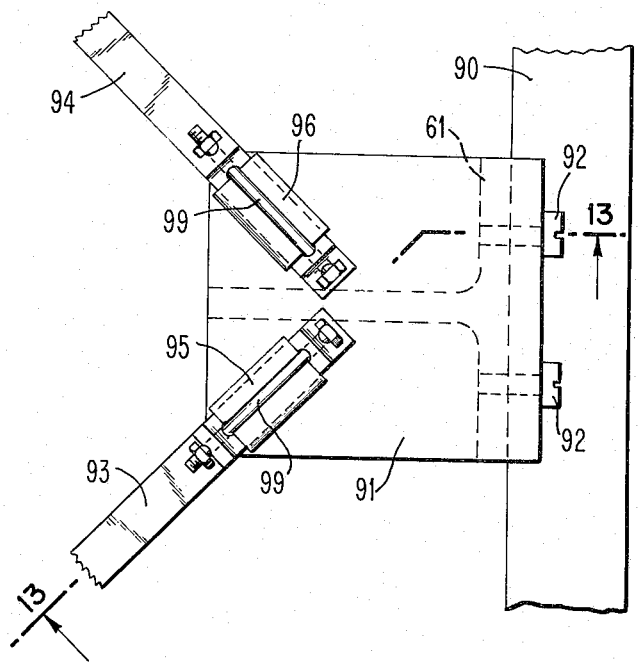
FIG. 12 is an enlarged fragmentary view of a portion of the apparatus illustrated in FIG. 11.
Figure 13:
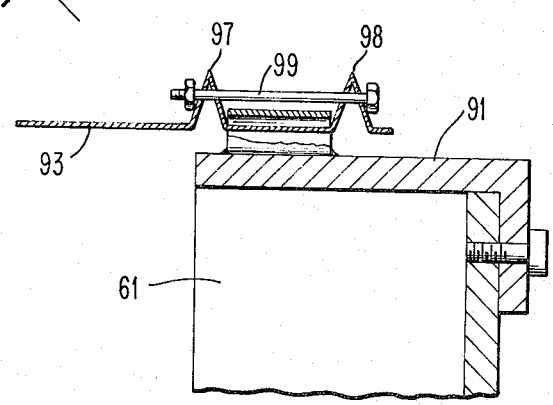
FIG. 13 is a fragmentary sectional view taken along line 13—13 of FIG. 12.

Additionally the groups 70 may be secured, either in the wrapped or unwrapped form by clamping the groups in a manner to wedge them intermediate the radially diverging arms 61 of the sets of arms 60A and 60B. To this end and referring now to FIGS. 11–13, arms 61 may be provided with caps, in the illustrated instance comprising L-shaped brackets 91 which may be secured to the flange 61A of the T-shaped arms 61 as by bolts 92. Straps 93 and 94 may then be criss- crossed over the group 70 and secured to the caps to press the group into the space intermediate adjacent arms 61 of the sets of arms 60A and 60B. The straps may be adjustably coupled to the caps as by passing the same through obtusely arranged pipes 95 and 96 connected to the caps. The straps may be kinked at either side of the pipe as at 97 and 98 and a bolt 99 passed through apertures in the kinks to permit tensioning of the straps. Alternately, of course, a turnbuckle arrangment may be provided to connect the straps to the arms 61 and to effect proper tensioning of the straps.

It should be recognized that the elements of the present invention give a significant economic advantage in both shipping and in makeup prior to placement at the job site. Additionally, the construction of the same permits more rapid construction of the plant site and faster in place service of the secondary treatment apparatus 50.

Although the invention has been described with a certain degree of particularity, it is understood that the present disclosure has been made only by way of example and that numerous changes in the details of construction, the combination and arrangement of parts, and the method of operation may be made without departing from the spirit and the scope of the invention as hereinafter claimed.

What is claimed is:

1. Biological mass growing media for attachment to the rotor of a rotating biological reactor, said media comprising: a group of thin wedge-shaped elements each having opposite planar major surfaces and each surface having a pattern of protrusions and depressions therein; said elements of said group including coacting projections and receptacles in adjacent elements, at least some of said coacting projections and receptacles on said adjacent elements serving as spacer means intermediate each of said elements to effect a predetermined spacing of said elements one from the other; alignment means in each of said elements to insure alignment of adjacent elements one to the other, said alignment means including pockets in each of said elements and latch means in each of said elements; said pockets in one element aligning and cooperating for engagement with latches in an adjacent element.

2. A biological mass growing media in accordance with claim 1 wherein said latches of one element enter into said pockets of an adjacent element and are frictionally engaged by said pockets.

3. A biological mass growing media in accordance with claim 1 wherein said latches and pockets are connected together after engagement one with the other.

4. A biological mass growing media in accordance with claim 1 including radially extending ribs circumscribing said pockets.

5. A biological mass growing media in accordance with claim 1 including a rib adjacent the periphery of said elements.

6. A group of elements for a biological reactor in accordance with claim 2 wherein when said first and second set of elements are arranged in a group, the elements of said first set are arranged in interdigitated superimposed relationship with respect to the elements of said second set.

* * * * *